Patented June 25, 1935

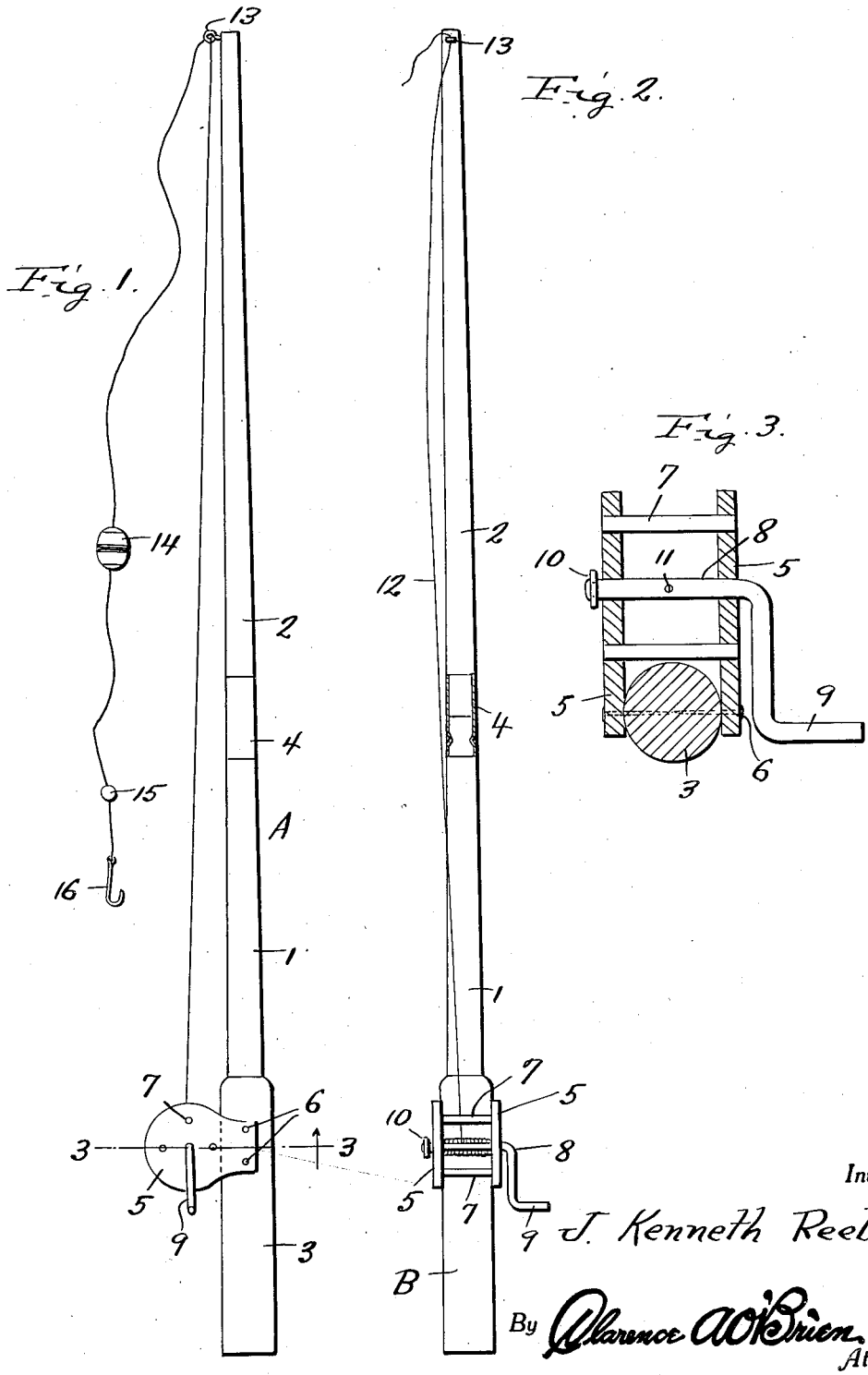

2,005,803

UNITED STATES PATENT OFFICE 2,005,803

TOY FISHING OUTFIT

Jesse Kenneth Reel, Cantril, Iowa, assignor of one-half to John N. Calhoun, Keosauqua, Iowa Application May 22, 1934, Serial No. 727,005

1 Claim. (Cl. 46—37)

This invention relates to a toy fishing outfit, the general object of the invention being to provide a two-piece pole, a reel frame attached to the handle part of the pole and containing a rotary shaft to which the line is connected, the line passing through an eye in the small end of the pole, with a bob, weight and hook attached to the line, so that the device will afford considerable amusement to children and the device can be sold at small cost.

This invention also consists in certain other features of construction and in the combination and arrangement of the several parts, to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which:—

Figure 1 is an elevation of the device.

Figure 2 is a view looking toward the open part of the reel frame and showing the sleeve for connecting the two parts of the pole together in section.

Figure 3 is a section on line 3—3 of Figure 1.

In this drawing, the pole A is shown as composed of the parts 1 and 2, the part 1 having an enlarged handle forming portion 3, with the rest of the pole tapering outwardly from the handle portion and the end of this tapered portion having a metal sleeve 4 attached thereto, the outer part of which is adapted to removably receive the reduced end of the part 2, as shown in Figure 2. A pair of plate-like members 5 is attached to opposite sides of the handle part 3 by the pins 6 and pins 7 have their ends passing through the members 5 and a shaft 8 passes through holes in the central portions of the members 5, so that this shaft is rotatably supported by the members and has one end bent twice at right angles to provide a crank handle 9. A projection 10 on the other end of the shaft holds it in place and the shaft is formed with a hole 11 for receiving one end of the line 12, said line passing through an eye 13 at the outer end of the pole and said line carries the bob 14, the weight 15 and a barbless hook 16. The line passes over one of the pins 7, as shown in Figure 1, so that this pin acts as a guide for the line as it is being wound upon the shaft when the shaft is rotated.

Thus I have provided a simple form of toy fishing outfit which can be manufactured to sell at low cost and which will afford considerable amusement to children, as they can take the pole apart and wind and unwind the line in a manner simulating a regular fishing outfit.

It is thought from the foregoing description that the advantages and novel features of the invention will be readily apparent.

It is to be understood that changes may be made in the construction and in the combination and arrangement of the several parts, provided that such changes fall within the scope of the appended claim.

What is claimed is:

In a toy fishing outfit including a pole and a line, said pole having an elongated handle portion, a pair of spaced plates connected to the opposite sides of the handle portion intermediate the ends thereof, an annular row of pins carried by the plates, a shaft rotatably supported by the plates and around which the row of pins is concentrically arranged, one end of the shaft being extended and bent to form a handle, one end of the line being connected to the shaft and having a portion passing over one of the pins.

JESSE KENNETH REEL.